(12) United States Patent
Petrovic

(10) Patent No.: US 6,286,659 B1
(45) Date of Patent: Sep. 11, 2001

(54) MOTORIZED CONVEYOR PULLEY

(75) Inventor: Zmaj Petrovic, Westmount (CA)

(73) Assignee: GEBO Conveyors, Consultants & Systems, Inc., Laval (CA)

( * ) Notice: Subject to any disclaimer, the term of this patent is extended or adjusted under 35 U.S.C. 154(b) by 0 days.

(21) Appl. No.: 09/210,304

(22) Filed: Dec. 11, 1998

Related U.S. Application Data

(63) Continuation-in-part of application No. PCT/CA97/00348, filed on May 22, 1997.

(30) Foreign Application Priority Data

Jun. 11, 1996 (CA) .................................................. 2178784
Nov. 19, 1996 (CA) .................................................. 2190689

(51) Int. Cl.$^7$ .................................................. B65G 39/06
(52) U.S. Cl. ........................ 198/780; 198/785; 193/37
(58) Field of Search .............................. 198/781.04, 780, 198/781.02, 785; 193/37, 35 C

(56) References Cited

U.S. PATENT DOCUMENTS

| | | | |
|---|---|---|---|
| 3,861,517 | 1/1975 | Theijsmeijer | 198/127 R |
| 3,899,063 | 8/1975 | Pollard | 193/35 A |
| 3,957,147 | 5/1976 | Specht | 193/37 |
| 4,034,837 | 7/1977 | Vinaresik et al. | 193/37 |
| 4,063,636 | 12/1977 | vom Stein | 198/781 |
| 4,078,641 | 3/1978 | Payne | 193/37 |
| 4,148,386 | 4/1979 | Bradbury | 193/37 |
| 4,168,771 | 9/1979 | Krivec | 193/35 A |
| 4,221,288 | 9/1980 | Rae | 198/781 |
| 4,312,444 | 1/1982 | Mushovic | 198/780 |
| 4,339,158 | 7/1982 | Greener et al. | 308/20 |
| 4,402,390 | 9/1983 | Feeney | 193/37 |
| 4,441,601 | 4/1984 | Rood | 193/37 |
| 4,664,243 | 5/1987 | Martin | 193/37 |
| 4,852,230 | 8/1989 | Yu | 29/148.4 |
| 5,088,596 | 2/1992 | Agnoff | 198/788 |
| 5,421,442 | 6/1995 | Agnoff | 193/37 |

*Primary Examiner*—Christopher P. Ellis
*Assistant Examiner*—Rashmi Sharma
(74) *Attorney, Agent, or Firm*—Cook & Franke S.C.; Timothy J. Ziolkowski

(57) ABSTRACT

A conveyor roller for motorized conveyors including a lateral friction torque limiting mechanism to drive a roller tube via a rotation driving element. The torque limiting mechanism includes a first friction surface associated with the roller tube and a second friction surface associated with the drive element. The second friction surface is made of a magnetic material. The first and second friction surfaces are applied one against the other through a magnetic field generated by permanent magnets. When the force required to rotate the roller tube is higher than the frictional force between the first and second friction surfaces, slippage will occur between the first and second friction surfaces, stopping the rotation of the roller. The drive element includes ventilation channels to thereby cool the friction surfaces.

6 Claims, 7 Drawing Sheets

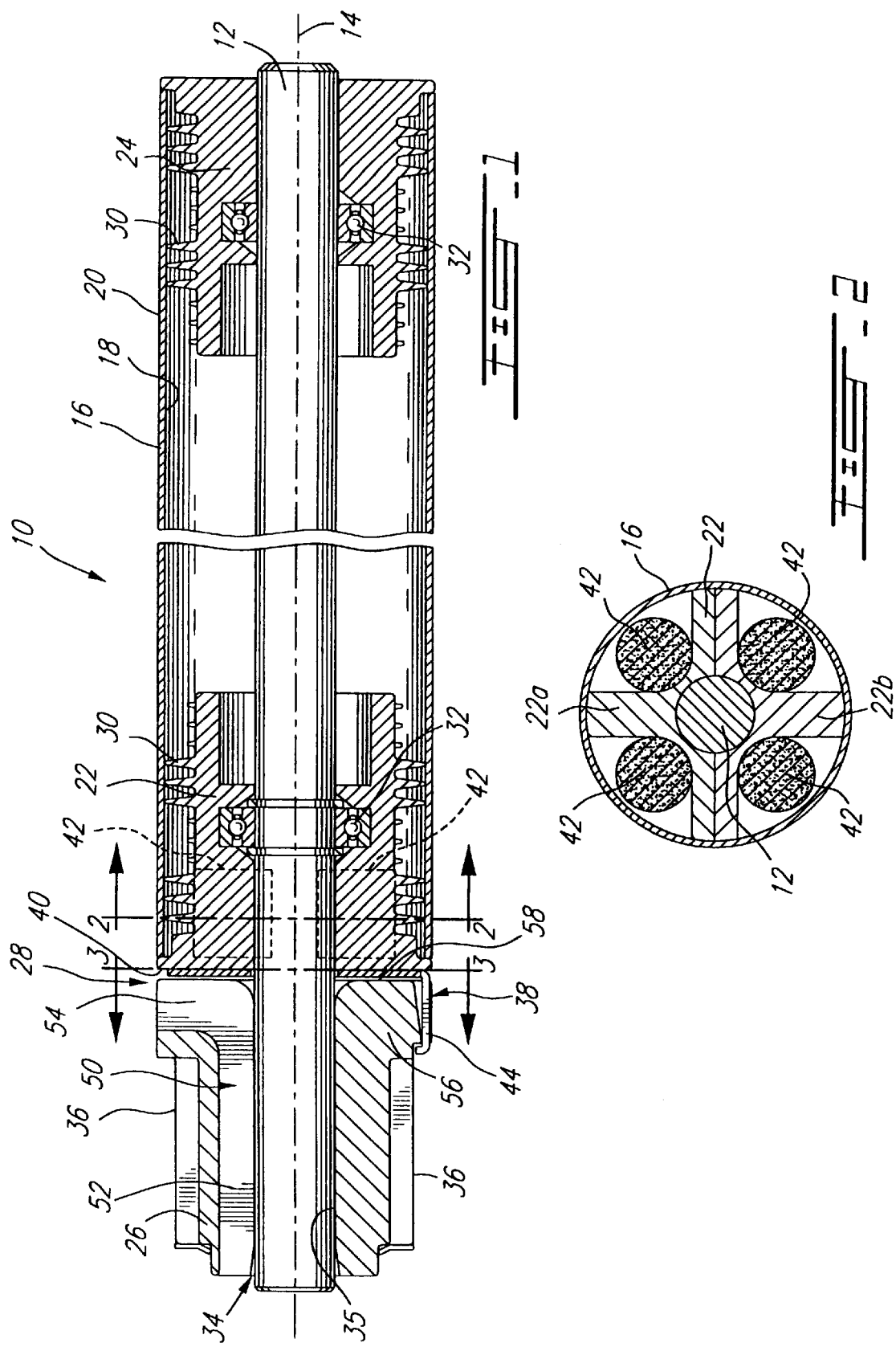

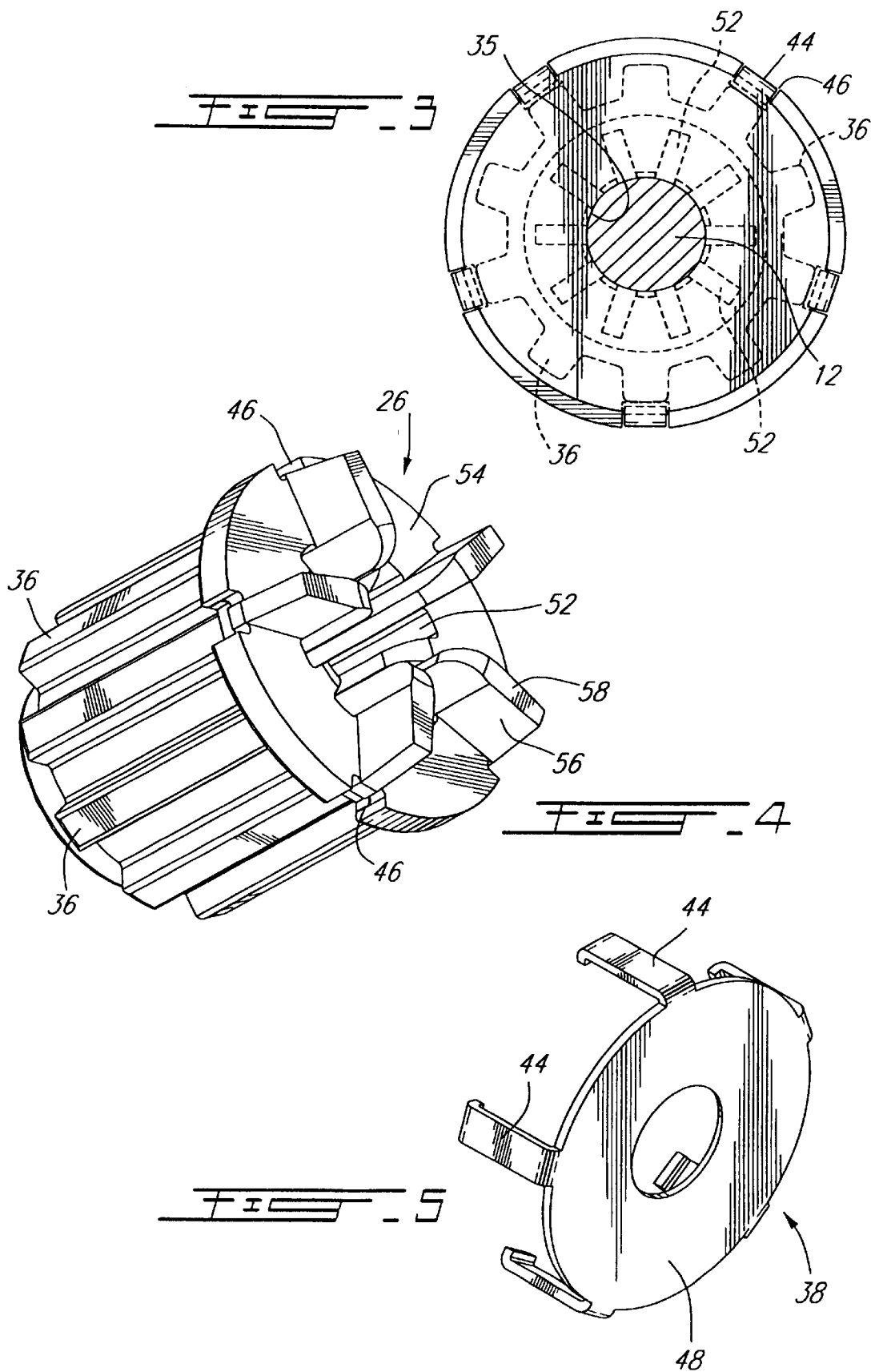

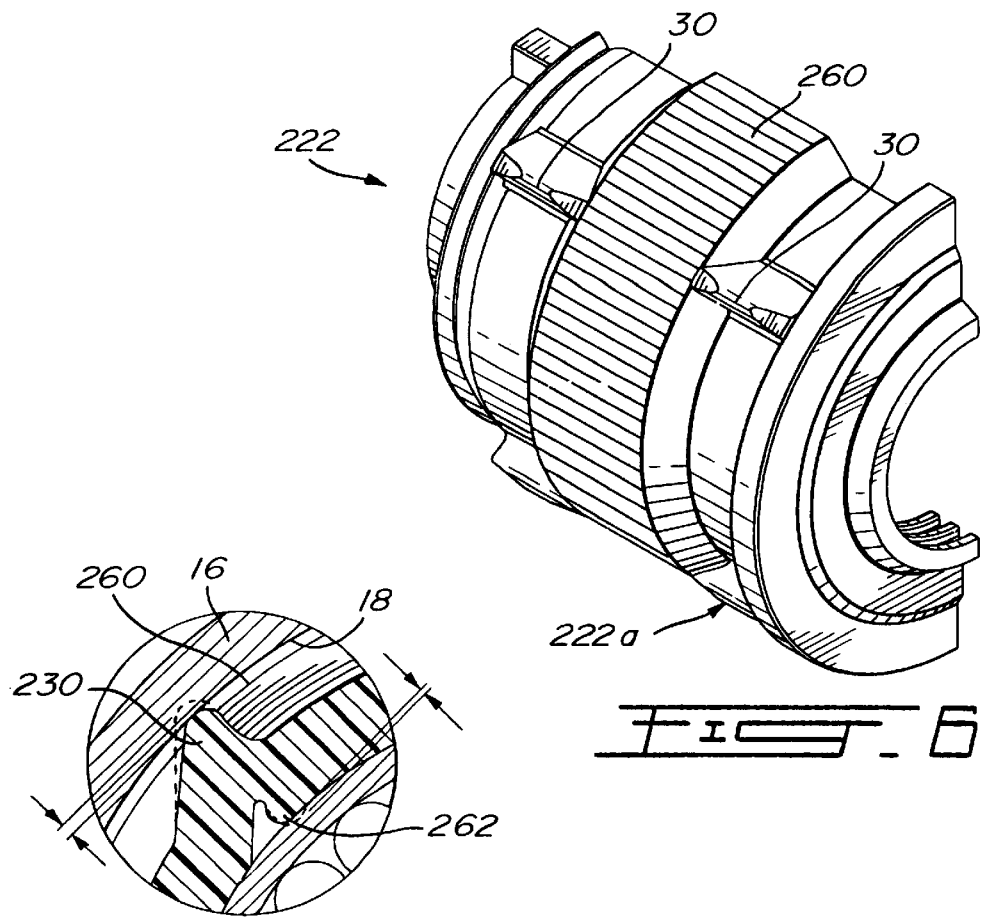
FIG. 6
FIG. 8
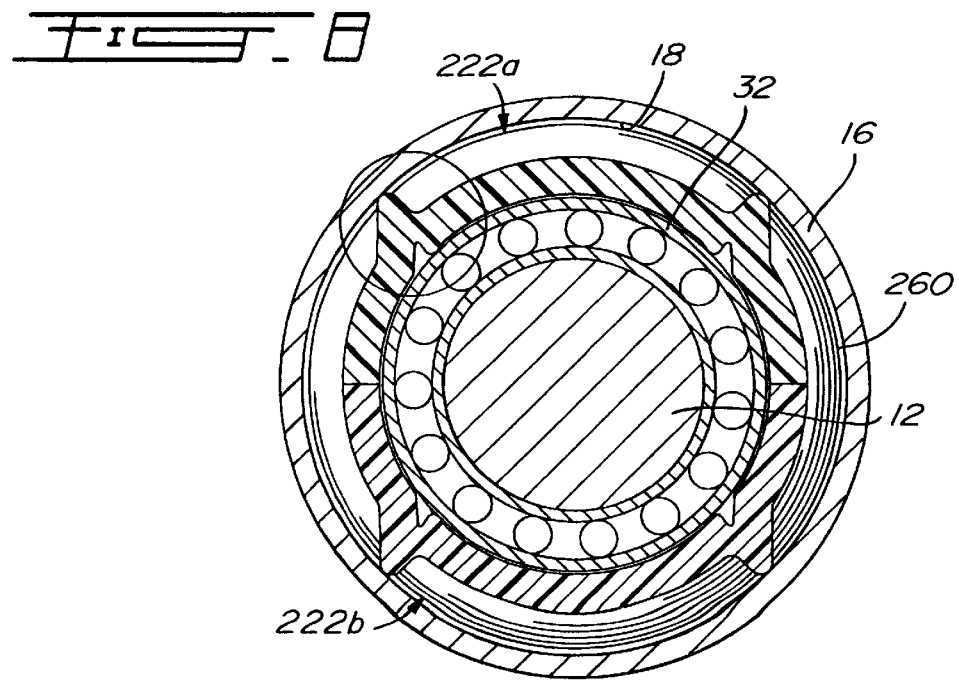
FIG. 7

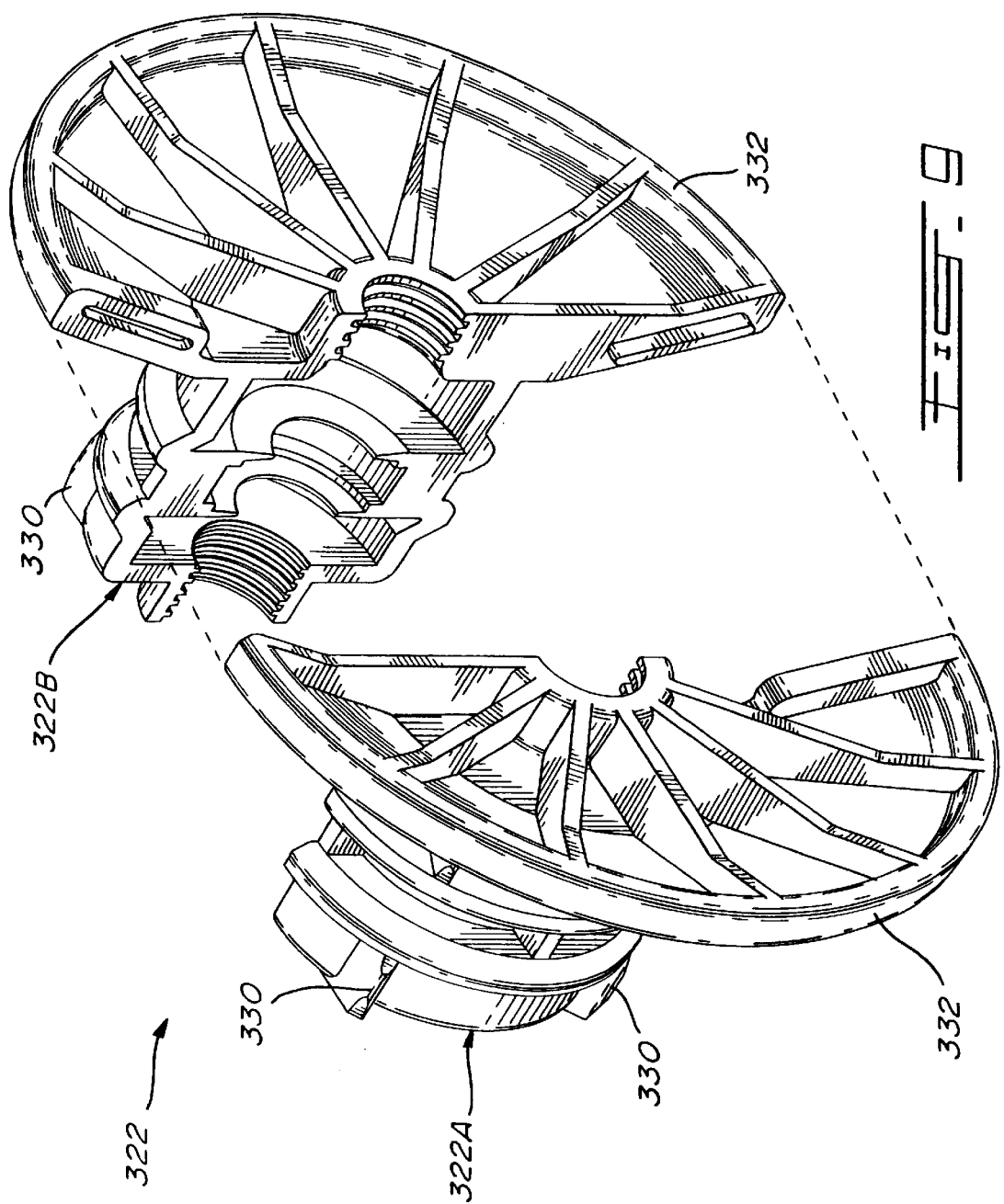

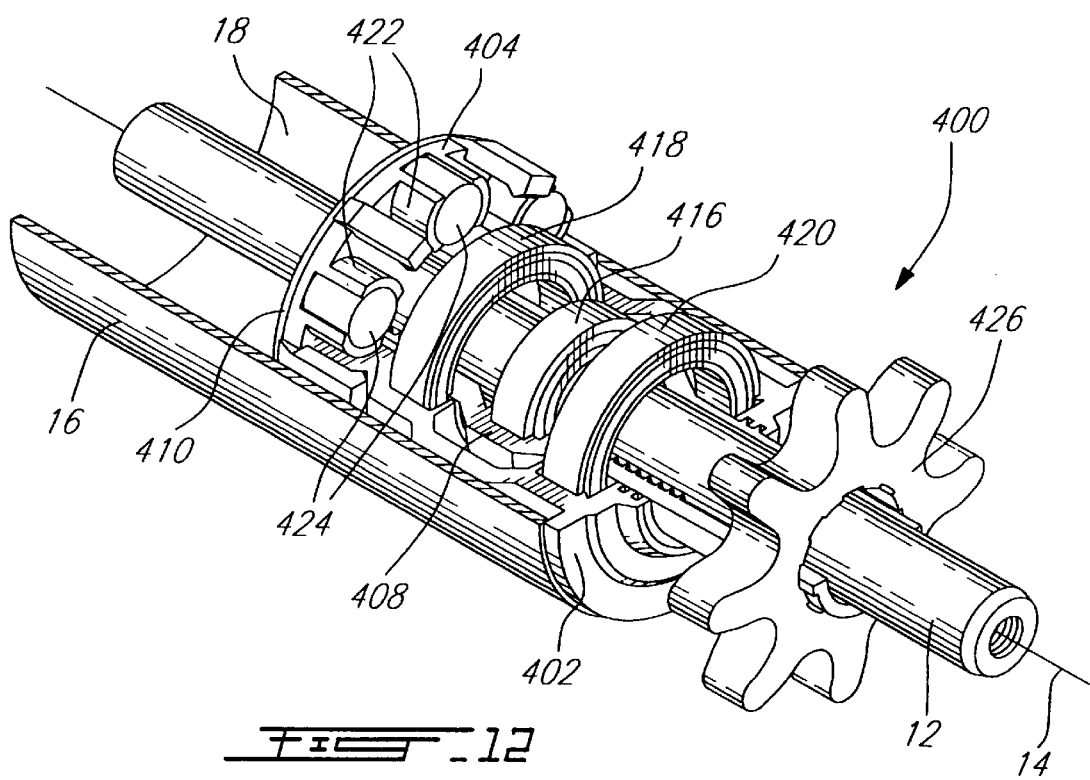

MOTORIZED CONVEYOR PULLEY

This application is a CIP of PCT/CA97/00348 filed May 22, 1997.

FIELD OF THE INVENTION

The present invention relates to conveyor rollers. More specifically, the present invention relates to a roller for a motorized conveyor, the roller including a torque limiting mechanism to limit the torque transmitted from a driving system of the motorized conveyor to the roller.

BACKGROUND OF THE INVENTION

Motorized conveyors are known in the art. Most conveyors are well suited to longitudinally move objects from a first location to a second location along a predetermined path that may include horizontal potions, rising portions and descending portions.

It is often necessary to install torque limiting devices to motorized conveyors in order to restrict roller rotation when the required torque to rotate the roller is above a predetermined level. For example, if boxes are momentarily stopped on the predetermined path of the conveyor, for example, at a filling station, it is usually advantageous to stop the rotation of the rollers placed directly below the stopped boxes to reduce the wearing effect of the rollers on the bottom of these boxes. Furthermore, if a stream of boxes are stopped on the conveyor path, the sum of the pressures applied on the boxes by the push of the motorized rollers could cause the first boxes to be crushed. Of course, the rotation of the rollers should automatically resume when the boxes are no longer stopped.

U.S. Pat. No. 4,221,288 issued on Sep. 9, 1992 to George Rae discloses a motorized conveyor having rollers provided with tangential frictions torque limiting device. The term "tangential friction" is to be construed herein as a frictional force generated between two surfaces, usually curved, along a tangent generally perpendicular to a rotation axis, where the direction of the resulting friction force is opposite to the rotation direction. The torque limiting device described in the Rae patent includes three main elements: an adapter mounted to one end of the roller and having a predetermined external diameter, a driven element having an internal diameter slightly larger than the external diameter of the adapter and an endless belt exerting a pressure on the driven element to generate a tangential friction force between the internal surface of the driven element and the external surface of the adapter. The driven element is driven by a driving system of the motorized conveyor. When the force required to rotate the roller is less than the torque transmitted through the frictional engagement of the driven element and the adapter, the roller will be rotated. However, if the required torque to rotate the roller is greater than the torque transmitted through the frictional engagement, slippage will occur between the driven element and the adapter, therefore restricting the roller rotation.

U.S. Pat. No. 5,088,596 issued on Feb. 18, 1992 to Charles Agnoff discloses another motorized roller for a conveyor. The roller is provided with a motor installed inside the roller torque limiting device. In the present disclosure and in the appended claims, the term "lateral friction" is to be construed as a friction force created between two surfaces being generally perpendicular to a rotation axis; the direction of the friction force generated by lateral friction is opposite to the rotation direction. The torque limiting device described in this patent includes a clutch mechanism adapted to slip at a predetermined torque to protect the motor. The clutch mechanism includes a pair of disks frictionally engaged. The clutch means is associated with a drive member engaging the inner wall of the roller tube. When the force required to turn the roller tube is lower than the friction force present between the disks of the dutch mechanism, the roller tube is rotated. However, if the force required to rotate the roller tube is higher than this friction force, the dutch mechanism will slip and the rotation of the roller tube will be stopped.

The torque limiting devices disclosed by Rae and Agnoff include a common drawback: it is difficult to cool these torque limiting devices. Indeed, in the device described by Rae, the endless belt decreases the air contact area. On the other hand, in the conveyor roller described by Agnoff, the torque limiting device is mounted inside the roller which prevents air contact altogether.

European Patent Application No. 0,199,045 filed on Oct. 3, 1986 and naming Marcello Moriconi as the inventor and U.S. Pat. No. 4,469,220 issued to Becker on Sep. 4, 1984 both describe magnetic coupling between a drive sprocket and a conveyor roller. In these systems, the magnetic field produced by magnets is used to provide a torque limited connection between a drive sprocket and a roller. A small air gap is provided between the magnets and the roller.

Other types of mechanisms exist to limit the torque transmitted to a conveyor roller. For example, some rollers are filled with a viscous liquid and include internal projections or blades that must overcome the resistance of this liquid when the roller rotates. A drawback of this type torque limiting device is that the limit of the torque is dependant on the load imposed on the roller.

OBJECTS OF THE INVENTION

An object of the present invention is therefore to provide an improved roller for conveyor.

Another object of the invention is to provide a conveyor roller to be driven by an external motor and provided with a lateral friction torque limiting mechanism free of the above-mentioned drawback of the prior art.

SUMMARY OF THE INVENTION

More specifically, in accordance with the present invention, there is provided a conveyor roller to be mounted to a shaft (12) defining a longitudinal axis (14), the conveyor roller including a roller tube (16) coaxial with the shaft and rotatably mounted thereto; a rotation driving element (26) coaxially mounted to the shaft; said rotation driving element being rotatable about the longitudinal axis; characterized by the fact that the conveyor roller comprises a lateral frictional torque limiting mechanism (28) interconnecting said driving element and said roller tube; said torque limiting mechanism including:

first friction element (22) mounted to said roller tube and including a first lateral friction surface (40);

second friction element (38) mounted to said rotation driving element and including a second lateral friction surface (48); and means for engaging said first and second friction surface one against the other to generate a friction force between said first and second friction surfaces, said friction force thereby causing said rotation of said roller tube through said rotation driving element when said force required to rotate said roller tube is lower than said friction force;

wherein one of said first and second friction elements is made of plastic material and wherein the other of said first and second friction elements is made of metallic material.

According to another aspect of the present invention, there is provided a conveyor roller to be mounted to a shaft (12) defining a longitudinal axis (14), the conveyor roller including a roller tube (16) coaxial with the shaft and rotatably mounted thereto; characterized by the fact that the conveyor roller comprises at least one hollow cylindrical adapter (322) providing mechanical connection between the shaft and said roller tube; said at least one adapter including a circular side guide (332) fixedly mounted thereto; said side guide being provided with a tapering portion.

Other objects, advantages and features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 1 is an elevational sectional view of a conveyor roller including a torque limiting mechanism, according to preferred embodiment of the present invention;

FIG. 2 is a sectional view taken along line 2—2 of FIG. 1;

FIG. 3 is a sectional view taken along line 3—3 of FIG. 1;

FIG. 4 is a perspective view of a drive sprocket according to an embodiment of the present invention;

FIG. 5 is a perspective view of a friction element to be mounted to a drive sprocket according to an embodiment of the present invention;

FIG. 6 is a perspective view of a half shell of an adapter used to provide positive mechanical contact between a shaft and a roller tube;

FIG. 7 is a radial sectional view of the adapter of FIG. 6 in operation between a shaft and a roller tube;

FIG. 8 is an enlarged radial sectional view of a portion of FIG. 7;

FIG. 9 is a perspective view of a half shell of an adapter used to provide positive mechanical contact between a shaft and a roller tube, the adapter being provided with an integral side guide;

FIG. 12 is a perspective view, partly sectional, of the torque limiting mechanism of FIG. 11 mounted in a conveyor roller.

DESCRIPTION OF PREFERRED EMBODIMENTS

Figure 10:
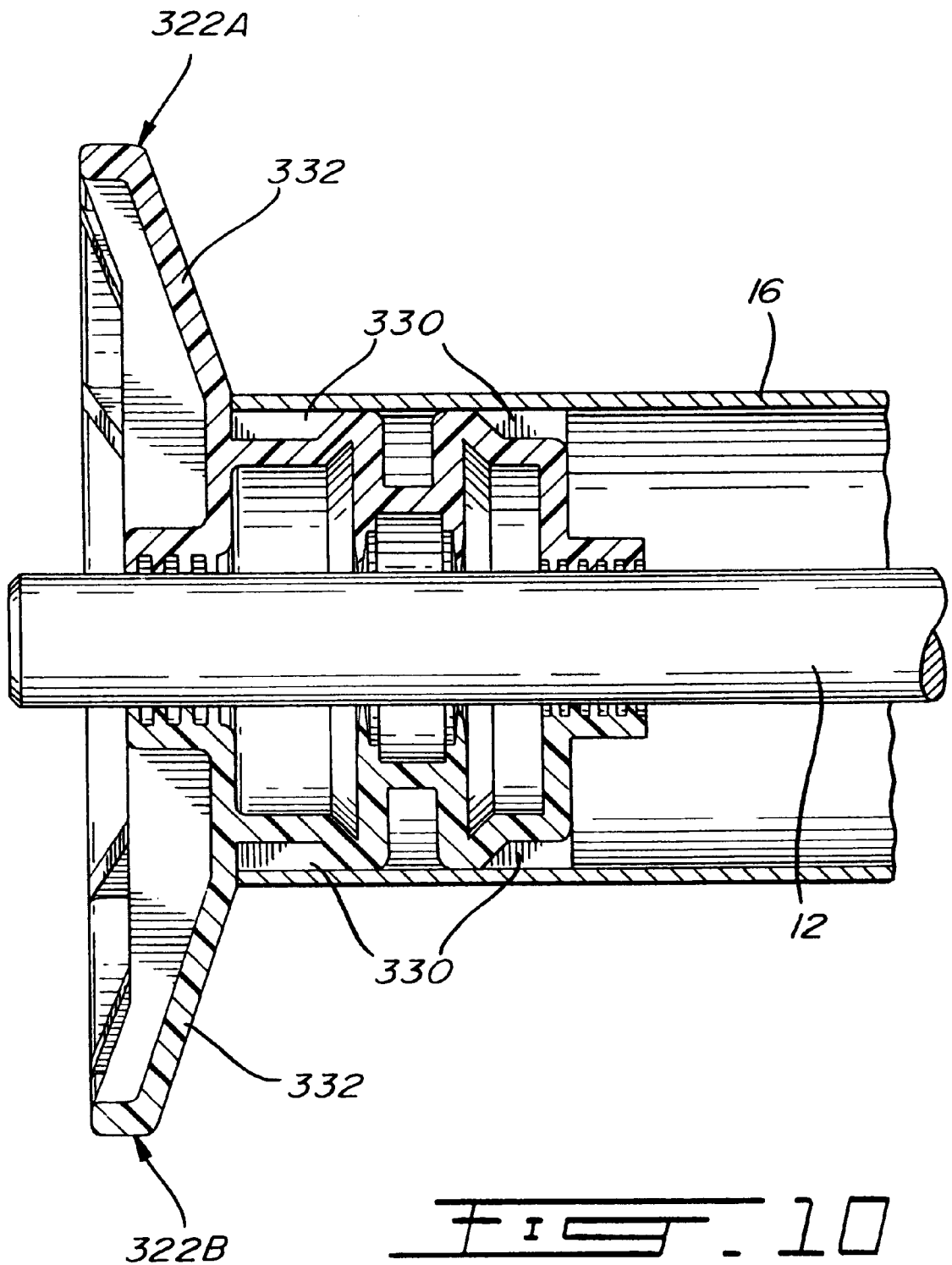
FIG. 10 is a longitudinal sectional view of the adapter of FIG. 9 in operation between a shaft and a roller tube.

The preferred embodiments of the present invention will now be described for illustrative purposes.

FIG. 1 of the appended drawings illustrates a sectional elevation view of a conveyor roller 10 including a torque limiting mechanism. The conveyor roller 10 is mounted to a shaft 12 having a longitudinal axis 14. The conveyor 10 includes a roller tube 16 provided with an internal surface 18 and an external surface 20, first and second identical adapters 20 and 24, a rotation driving element under the form of a drive sprocket 26 and a torque limiting mechanism 28.

The roller tube 16 is coaxially mounted to on shaft 12 through adapters 22 and 24 which are advantageously made of a plastic material. Each adapter 22 and 24 is made of two identical half shell 22A and 22B (see FIG. 2) having T-shaped transversal section. Slightly deformable radial protrusions 30 are formed on the peripheral portion of the adapters 22 and 24 to provide a mechanical connection between the adapters 22 and 24 and the internal surface 18 of the roller tube 16 without requiring highly accurate production tolerances. The mechanical connection between the adapters 22 and 24 and the shaft 12 is provided by ball bearings 32, mounted in an annular cavity of the adapters 22 and 24 and contacting the shaft 12, allowing rotation of the roller 10 about the longitudinal axis 14.

FIGS. 6 to 8 illustrate an adapter 222 adapted to optionally replace adapters 22 or 24. Adapter 222 is formed of two identical half shells 222A and 222B, provided with slightly deformable peripheral longitudinal projections 230.

FIG. 8 illustrates, in dash lines, a projection 230 without deformation and, in full line, the same project 230 with the required deformation to provide adequate mechanical contact between the adapter 222 and the internal surface 18 of the roller tube 16. Of course, the deformation of the projections 230 is variable and depends on the internal diameter of the roller tube 16.

The adapter 222 also includes a peripheral strip of non-deformable material 260 limiting the possible deformation of the projections 230.

As can be seen from FIG. 8, the adapter 222 also has internal deformable projections 262 providing mechanical connection between the internal surface of the adapter 222 and the ball bearing 32. The internal deformable projection 262 is illustrated without deformation in dash lines and is illustrated with the required deformation to enable adequate mechanical contact between the adapter 22 and the ball bearing 32 in full line.

Once again, the deformable projections 230 are indented to provide an adequate mechanical connection between the adapter 222 and the internal surface 18 of the roller tube 16 without requiring highly precise production tolerances, and the internal deformable projections 262 are intended to enable an adequate mechanical connection between the adapter 222 and the ball bearing 32 without requiring highly precise production tolerances.

FIGS. 9 and 10 illustrate an adapter 322 adapted to replace adapters 22 or 24. Adapter 322 is formed of two identical half shells 322A and 322B, provided with slightly deformable peripheral longitudinal projections 330 and with an integral side guide 332.

As can be better seen from FIG. 10, radially projecting side guides 332 are used to guide the objects transported on the rollers. This is an advantage over conventional side guides fixedly mounted beside the rollers since with this novel arrangement less friction will exist between the guides 332 and the objects being conveyed since the guides 332 rotate in unison with the rollers.

The drive sprocket 26 generally consists of a hollow cylinder including a central opening 34 defining an internal surface 35 having an internal diameter allowing the drive sprocket 26 to be rotatably mounted on shaft 12. The drive sprocket 26 includes teeth 36 (seen in FIGS. 1, 3 and 4) that may be connected to a toothed belt (not shown) to thereby interconnect the sprocket 26 and a driving system (not shown) to cause the rotation of the drive sprocket 26.

Turning now to FIGS. 1 and 5, the torque limiting mechanism 28 includes a friction element 38, a first generally annular friction surface 40 formed by the end of the adapter 22 (the adapter 22 itself acting as a friction element) and four cylindrical magnets 42 mounted in cavities of the adapter 22 defined between the half shells 22A and 22B and the internal surface 20 of the roller tube.

Still referring to FIGS. 1 and 5, the friction element 38 may be fixedly mounted to the drive sprocket 26 so as to be non rotating with respect to this sprocket 26. Indeed, the friction amount 38 may include five L-shaped projections 44 (see FIGS. 3–5) each including a hooked end that may be hooked onto notch 46 of drive sprocket 26, therefore preventing rotational and axial movements of the friction element 38 with respect to drive sprocket 26. Friction element 38 defines a second generally annular friction surface 48 and is advantageously made of magnetic material, for example, steel.

The first and second friction surfaces 40 and 48 are generally planar and are provided in a plane essentially perpendicular to longitudinal axis 14.

The operation of the torque limiting mechanism 28 will now be described. The magnets 42 generate a magnetic field (not shown) that axially pulls the friction element 28 towards the adapter 22, since the friction element 38 is made of magnetic material. This magnetic field is such that the first and second friction surfaces 40 and 48 are engaged one against the other with sufficient pressure to generate a frictional force between these two surfaces 40 and 48. This frictional force varies with the force with which the magnets 42 pull the friction element 38 towards the adapter 28 that, in turn, vary according to the intensity of the magnetic field and the distance between the magnets and the friction element 38.

As will be easily understood by one ordinary skill in the art, the magnets 42 could be replaced by other means to engage the friction surfaces 40 and 48 one against the other. For example, a spring system (not shown) applying a force suitable to engage the first and second friction surfaces 40 and 48 one against the other could be suitable. Other means to engage the friction surfaces 40 and 48 one against the other could be used for example, proportional electrovalve, or bag air spring. Of course, when such other means are used to engage the friction surfaces, 40 and 48 one against the other, it is not required that one of the friction surfaces 40 and 48 be made of magnetic material.

As discussed hereinabove, the drive sprocket 26 may be rotated about axis 14 through a toothed belt (not shown). When this is the case, the roller tube 16 will be rotated by the drive sprocket 26 as long as the force required to rotate the roller tube 16 about axis 14 does not exceed the frictional force between the friction surfaces 40 and 48.

If the force required to rotate the roller tube 16 exceeds the friction force between the friction surfaces, 40 and 48, a relative slippage will occur between these two surfaces, thereby suspending the rotation of the roller tube 16. Indeed, the drive sprocket 26 will still be rotated by the toothed belt (not shown) but the roller tube 16 will not rotate.

It is to be noted that when relative slippage occurs between the friction surfaces 40 and 48, the magnetic field generated by the magnets 42 still pulls the friction element 38, which is rotating, towards the adapter 22 which is not rotating This continued slippage create heat by friction between the friction surfaces 40 and 48. Mainly for this reason, ventilation channels 50 are provided in the drive sprocket 26, so as to cool friction element 38.

Each ventilation channel 50 is generally L-shaped and includes an axial portion (formed by two parallel axial passages 52) and a radial portion 54. The parallel axial passages 52 forming the axial portion are adjacent to shaft 12 and the radial portion are adjacent to friction element 38 when it is mounted to the drive sprocket 26. Therefore, air circulation will take place to cool friction element 38. This cooling is efficient since friction element 38 is heat conducting when is it made of metallic material. The heat generated by the friction of the surfaces 40 and 48 will therefore be transmitted to the air circulating in channels 50.

The longitudinal portions 52 of the ventilation channels 50 are formed by longitudinal grooves made in the internal surface 35 of the opening 34 of the drive sprocket 26.

The radial portions 54 of the ventilation channels 50 are defined by free space provided between the five axial projections 56 of the drive sprocket 26. Each axial projection 56 is provided with a free end 58 that is adjacent to the friction element 38 when the friction element 38 is mounted to the drive sprocket. The axial projections 56 of the drive sprocket therefore define a fan generating the above-mentioned air circulation.

It is to be noted that the magnets 42 are advantageously permanent magnets. Also, although four magnets are illustrated in FIGS. 1 and 2, the number of magnets used could be different to thereby modify the strength of the magnetic field pulling the second friction surface 48 towards the first friction surface 40 and thereby modify the friction force between these two friction surfaces 40 and 48. Similarly, the magnetic density of the magnets 42 may be selected so as to provide a predetermined frictional force between the two friction surfaces 40 and 48.

It is also to be noted that the force pulling the friction element 38 towards the adapter 22 varies with the distance between the friction element 38 and the magnets 42. Indeed, this force increases when the distance decreases. Furthermore, the strength of the magnetic field generating by the magnets 42 naturally decreases with time. However, this magnetic field strength decrease is compensated by the natural wear of the first friction surface 40 which will decrease the distance separating the friction element 38 and the magnets 42, which will keep the force pulling the friction element 38 towards the magnets 42 essentially constant.

Furthermore, as will be easily understood by one ordinary skilled in the art it will be possible to design a friction element 38 made of a magnetic material other than metal, as long as it is attracted to a magnet. It is however been found that, by using two different materials for the friction surfaces 40 and 48, such as, for example, plastic and metal, it is possible to create a more advantageous friction force between these two surfaces.

Figure 11:
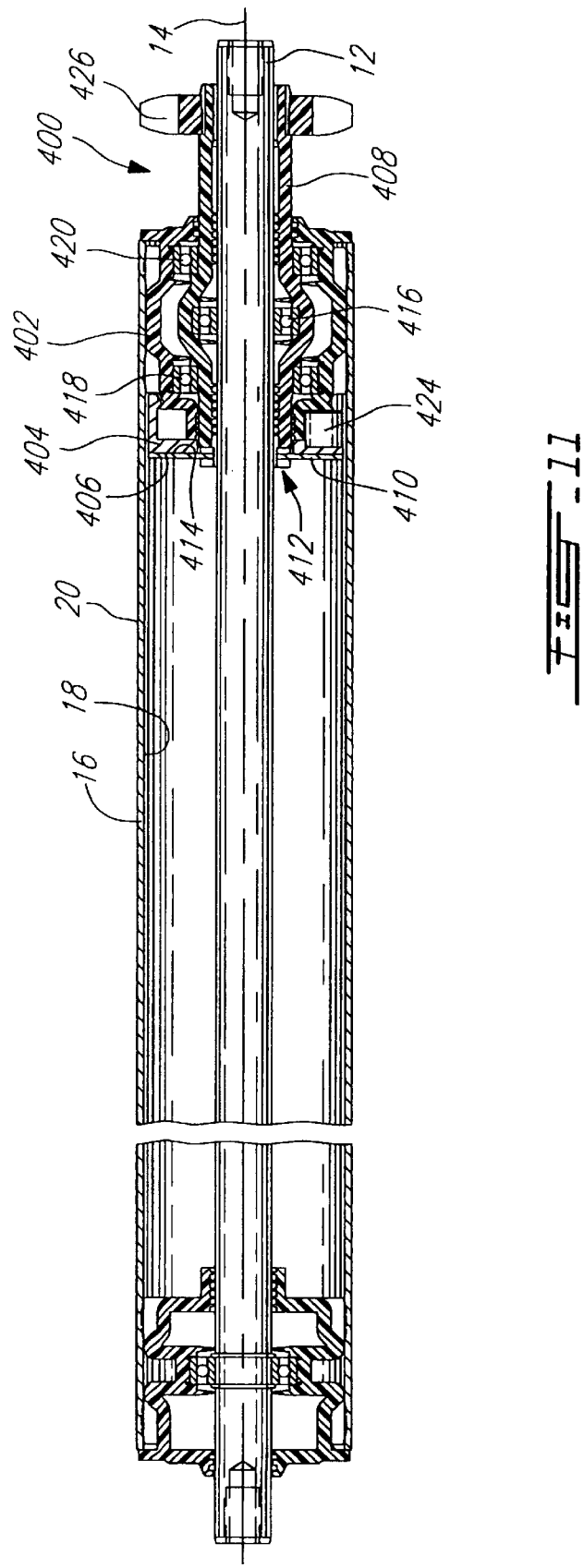
FIG. 11 is an elevational sectional view of a conveyor roller including a torque limiting mechanism, according to another embodiment of the present invention.

Turning now to FIGS. 11 and 12 of the appended drawings, a torque limiting mechanism 400 according to another embodiment of the present invention will be described.

It is to be noted that the torque limiting mechanism 400 operates under the same principles than the torque limiting mechanism 28 illustrated in FIGS. 1–5 and described hereinabove. Therefore, for concision purposes, the following description of the torque limiting mechanism 400 will focus on the difference between this mechanism and the torque limiting mechanism 28.

The torque limiting mechanism 400 includes a generally cylindrical roller tube contacting element 402 configured and sized to contact the internal surface 18 of the roller tube 16, a magnet supporting element 404 fixedly mounted to the tube contacting element 402 and defining a first generally annular friction surface 406, a shaft contacting element 408 rotatably mounted to both the shaft 12 and the tube contacting element 402 and a friction element 410 so mounted to the inner end 412 of the shaft contacting element 408 as to rotate with the rotation of the shaft contacting element 408, the friction element 410 defining a second generally annular friction surface 414. The friction element 410 is advantageously made of magnetic material.

As can be seen from FIGS. 11 and 12, the shaft contacting element 408 is rotatably mounted to the shaft 12 via a ball bearing assembly 416. Similarly, the tube contacting element 402 is rotatably mounted to the shaft contacting element 408 via two ball bearing assemblies 418 and 420.

The magnet supporting element 404 is advantageously made of plastic material and includes magnet mounting tabs 422 configured and sized to receive cylindrical permanent magnets 424 therebetween. While the magnet supporting element 404 is configured to receive from one to six magnets, it is believed within the reach of one skilled in the art to design a magnet supporting element configured to receive more than 6 magnets.

As will be easily understood by one skilled in the art, the magnetic field generated by the magnets 424 attracts the friction element 410 since this element is made of magnetic material. A friction force is therefore generated between the two friction surfaces 406 and 414. Since the friction element 410 is fixedly mounted to the shaft contacting element 408, rotation of the shaft contacting element about axis 14 will cause the rotation of the tube contacting element 402, thus causing the rotation of the roller tube 16 if the force required to rotate the tube 16 is not greater than the friction force between the friction surfaces 406 and 414.

Of course, a drive sprocket 426 is mounted to the shaft contacting element 408. The drive sprocket 426 includes teeth that may be connected to a toothed belt (not shown) to thereby interconnect the sprocket 426 and a driving system (not shown) to cause the rotation of the drive sprocket 426.

Although the present invention has been described herein above by way of preferred embodiments thereof, it can be modified, without departing from the spirit and nature of the subject invention as defined in the appended claims.

What is claimed is:

1. A conveyor roller to be mounted to a shaft (12) defining a longitudinal axis (14), the conveyor roller including a roller tube (16) coaxial with the shaft and rotatably mounted thereto; characterized by the fact that the conveyor roller comprises at least one hollow cylindrical adapter (322) providing mechanical connection between the shaft and said roller tube; said at least one adapter including a circular side guide (332) fixedly mounted thereto; said side guide being provided with a tapering portion.

2. A conveyor roller as recited in claim 1, wherein each said at least one cylindrical adapter includes two half shell.

3. A conveyor roller as recited in claim 1, wherein said at least one hollow cylindrical adapter include a ball bearing providing mechanical connection between said adapter and the shaft; each adapter being provided with deformable projections providing mechanical connection between said adapter and an internal surface of said roller tube.

4. A conveyor roller as recited in claim 3, wherein said deformable projections are longitudinal.

5. A conveyor roller as recited in claim 4, wherein said hollow cylindrical adapters include a peripheral portion made of non deformable material to thereby limit the deformation of said deformable projections.

6. A conveyor roller as recited in claim 5, wherein each said cylindrical adapter including a ball bearing enabling a mechanical connection between said adapter and the shaft; each adapter being provided with internal deformable projections enabling a mechanical connection between said adapter and said ball bearing.

* * * * *

UNITED STATES PATENT AND TRADEMARK OFFICE
CERTIFICATE OF CORRECTION

PATENT NO. : 6,286,659 B1
DATED : September 11, 2001
INVENTOR(S) : Zmaj Petrovic It is certified that error appears in the above-identified patent and that said Letters Patent is hereby corrected as shown below:

Column 2,
Lines 6 and 9, change "dutch" to -- clutch --.

Signed and Sealed this

Fifth Day of March, 2002

Attest:

Attesting Officer

JAMES E. ROGAN
Director of the United States Patent and Trademark Office